… … … … … … … … … … … … … … … US005566088A

United States Patent [19]
Herscher et al.

[11] Patent Number: 5,566,088
[45] Date of Patent: Oct. 15, 1996

[54] MODULAR RADIO TEST SYSTEM AND METHOD

[75] Inventors: Bret Herscher, Cupertino, Calif.; Robert J. Skalka, Tempe; Glen E. Sater, Phoenix, both of Ariz.

[73] Assignee: Motorola, Inc., Schaumburg, Ill.

[21] Appl. No.: 258,645

[22] Filed: Jun. 13, 1994

[51] Int. Cl.⁶ ............................................. H05K 1/12
[52] U.S. Cl. ................. 364/514 B; 364/579; 364/580
[58] Field of Search ................... 364/514 B, 579, 364/580, 481; 455/67.1; 379/1, 10, 19, 21

[56] References Cited

U.S. PATENT DOCUMENTS

| H1,489 | 9/1995 | Doan et al. | 364/550 |
|---|---|---|---|
| 4,402,055 | 8/1983 | Lloyd et al. | 364/579 |
| 4,630,224 | 12/1986 | Sollman | 364/550 |
| 4,680,674 | 7/1987 | Moore | 361/395 |
| 4,858,162 | 8/1989 | Kleffer et al. | 364/708 |
| 4,884,228 | 11/1989 | Stanley et al. | 364/579 |
| 4,893,263 | 1/1990 | Myers | 364/708 |
| 4,894,792 | 1/1990 | Mitchell et al. | 364/708 |
| 4,903,222 | 2/1990 | Carter et al. | 364/708 |
| 5,020,011 | 5/1991 | Stark et al. | 364/580 |
| 5,059,892 | 10/1991 | Stoft | 324/73.1 |
| 5,099,437 | 3/1992 | Weber | 364/550 |
| 5,117,378 | 5/1992 | Ho | 364/708 |
| 5,126,954 | 6/1992 | Morita | 364/708 |
| 5,182,698 | 1/1993 | Kobayashi et al. | 361/395 |
| 5,186,646 | 2/1993 | Pederson | 439/374 |
| 5,196,993 | 3/1993 | Herron et al. | 361/393 |
| 5,227,988 | 7/1993 | Sasaki et al. | 364/709.01 |

OTHER PUBLICATIONS

An article entitled "R–2600 Communications System Analyzer", © Copyright 1993 Motorola, Scottsdale, AZ, Printed in the U.S.A. Mar. 1993, pp. 1–8.
An article entitled "R–2600 Communications System Analyzer: with Cellular Radio Test Options", © Copyright 1993 Motorola, Scottsdale, AZ.
An article entitled "R–2660 Communications System Analyzer", © Copyright 1994 Motorola, Scottsdale, AZ, Printed in the U.S.A. Apr. 1994 10K, pp. 1–12.
An article entitled "R–2670 FDMA Digital Communications System Analyzer", © Copyright 194 Motorola, Scottsdale, AZ, Printed in the U.S.A. Apr. 1994, pp. 1–12.
An article entitled "Cellular Base Site Testing System", © 1993 Motorola, Scottsdale, AZ.

Primary Examiner—Emanuel T. Voeltz
Assistant Examiner—Craig Steven Miller
Attorney, Agent, or Firm—Frank J. Bogacz; Robert M. Handy

[57] ABSTRACT

A tester for multiple types of radios has a first group of generic test elements common to all types of radios to be tested and second groups of test elements specific to each one of the multiple types of radios. Each of the second groups of test elements is mounted within a pluggable module for insertion into the tester where it couples to a common bus accessed by all of the other test elements and by the controlling computer. Each pluggable module contains a specific identifier which, when accessed by the controlling computer initiates a stored program which causes the computer, via the bus, to couple the various test elements into a configuration required to test the radio type associated with that identifier. The system is very compact and conveniently uses a lap top computer as the controlling element.

32 Claims, 6 Drawing Sheets

MODULAR RADIO TEST SYSTEM AND METHOD

FIELD OF THE INVENTION

The present invention relates to an improved means and method for testing a wide range of modem radios and radio systems, and more particularly, a radio test system whose operating configuration can be varied by means of changeable personality modules and a method of accomplishing such reconfiguration.

BACKGROUND OF THE INVENTION

A radio test system generally comprises a configuration of test equipment used for measuring the performance parameters of an individual radio, of a radio system, or of any desired sub-system thereof Radio test sets are the primary equipment utilized in radio servicing and are also commonly referred to as "Service Monitors" and/or "Communications Systems Analyzers". In general, radio test systems are routinely used in the manufacture, calibration, repair, installation and general servicing of radios and radio systems both for the purpose of evaluating the performance of the radio or radio system and as a general purpose diagnostic tool to aid in the repair and/or adjustment of a broken or mis-aligned radio, radio system or any constituent sub-system or component of the radio or radio system.

With the advent of progressively more complex radio systems there has been a rapid divergence away from the simple amplitude modulation (AM) and frequency modulation (FM) technologies which were the standard modulation techniques in prior radio systems. More advanced radio systems make extensive use of digital signal processing to improve their spectral efficiency and to decrease the cost of the radio service provided to the user of the radio. The inclusion of digital signal processing permits use of more spectrally efficient modulation technologies such as Time Division Multiple Access (TDMA), Code Division Multiple Access (CDMA), Quadrature Phase Shift Keying (QPSK) and Quadrature Amplitude Modulation (QAM) techniques. These and other present day modulation techniques are fundamentally digital in nature, transmitting information as a digital bit stream, which is received and decoded as digital words by the radio receiver.

As a consequence of this technological evolution, radio tests systems must have increasing capability and flexibility, especially the ability to handle many different modulation and signal coding techniques over a wide range of frequencies and signal levels. Present day radio test systems are generally created by hard-wiring together various test elements such as signal generators, modulators, demodulators, I/O devices, amplifiers, mixers, coders and decoders (CODECs), amplifiers, detectors, spectrum analyzers, synthesizers, display devices, measuring devices, and so forth in a comparatively fixed configuration capable of testing a particular radio or radio system. When it is desired to test a different type of radio or radio system, the various sub-elements must be disassembled and reconnected in a new configuration adapted for the new radio or radio system.

Where it is desired that a single test set be able to handle multiple types of radios, the necessary test elements must be included and the various test elements made to be settable by panel switches or the like. As the number of different types of radios and radio systems increases, this classical approach to creating suitable test sets is no longer practical. Test sets made in this way are burdened by the requirement of having within the test set the capability to test all the envisioned radios even though most of the radio specific hardware stands idle much of the time. Such test sets become undesirably complex and expensive to build and operate and/or are undesirably time consuming to m-configure for different types of radios. Accordingly, there continues to be a need for an improved test system and method capable of accommodating a wide variety of modem radios and radio systems in a convenient and economic manner, and which may be easily and quickly re-configured for different types of radios.

For convenience of expression, the abbreviation "DUT" standing for "Device Under Test" is used to refer to the radio or radio system or sub-system intended to be tested. The words "radio test system" and "radio test set" are used interchangeably to refer to a means for testing radios or radio systems or sub systems or combinations thereof.

BRIEF DESCRIPTION OF THE DRAWINGS

FIGS. 2 and 3 and 4 are intended to be considered together.

FIGS. 2–4 are intended to be considered together.

DETAILED DESCRIPTION OF THE PREFERRED EMBODIMENTS

Figure 1:
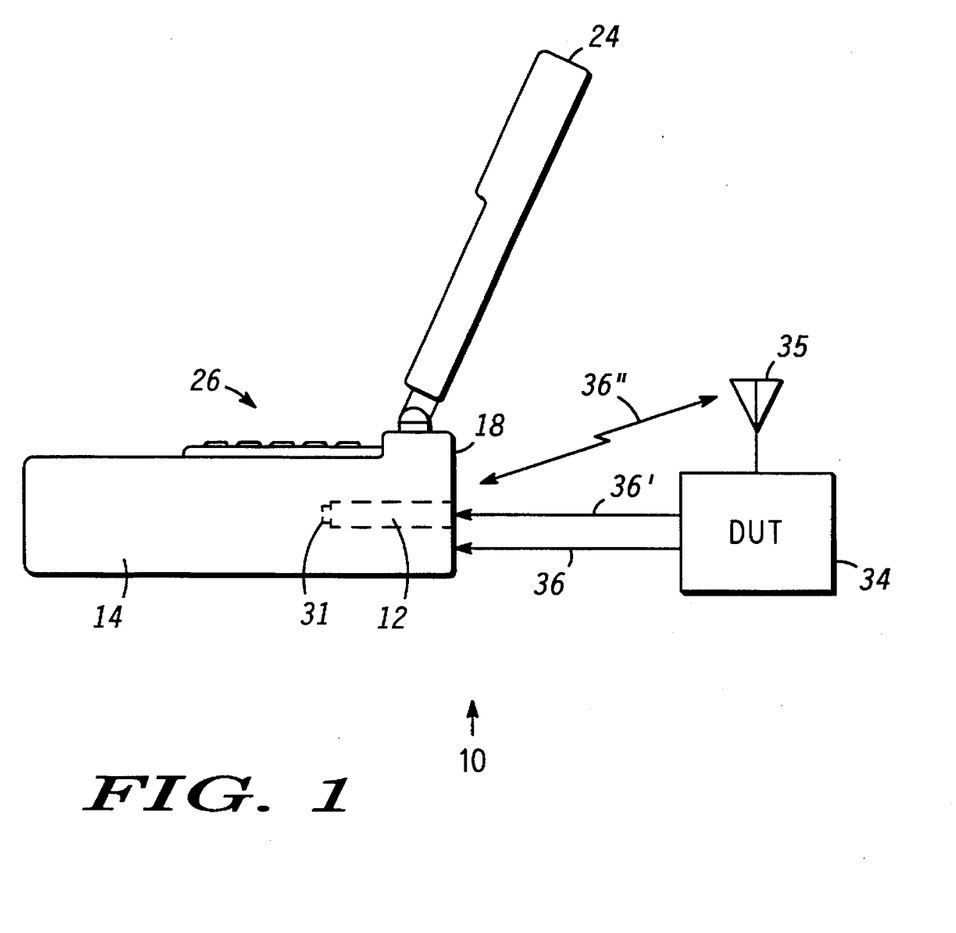
FIG. 1 shows a simplified, overview block diagram of a radio test set according to the present invention.

FIG. 1 is a simplified overview block diagram of a preferred embodiment of the test set 10 for testing radio (DUT) 34, according to the present invention. DUT 34 is coupled by lines 36, 36' to radio test set 10, or by radiative coupling 36" (e.g., electro-magnetic or sonic) from, for example, antenna or other emitter-receptor 35 of DUT 34 or by optical coupling or by any combination thereof. Lines 36, 36' are generally multi-conductor lines and, depending upon the particular radio being tested, can include a wide variety of electrical, optical and sonic signals as well as power and ground. Lines 36, 36' may include fiber optic links or other means of optical or sonic coupling. Typical electrical signals are RF, IF, LO and audio frequency and analog and digital signals. Reference to signal transfer along lines 36, 36' is intended to included optical and/or electrical coupling via suitable conductors or fibers from DUT 34 to and from test set 10 as well as radiative transfer (e.g., low or high frequency radio waves or optical or audio or ultrasound or a combination thereof) via path 36" to and from antenna or other emitter-receptor device 35 to test set 10.

Radio test set 10 comprises multiple test elements identified collectively by the reference number 14 which are common to all of the types of radios to be tested and multiple test elements identified collectively by the reference number 12 which are specific to each individual type of radio to be tested. Together, elements 12, 14 make up all of the elements needed to test the radios. While for each test set 10 there is only one collection 14 of common test elements, there are multiple groups 12 of specific test elements which are, in general, different for each different type of radio. In the preferred embodiment, test elements 12 are housed in a user demountable or pluggable module which is coupled to elements 14 in test set 10 by separable connector or coupling 31.

Test set 10 and common elements 14 include computer 18, shown in profile here in its preferred form as a lap-top type computer including display or other output 24 and keyboard or other input 26. Test set 10 is customized for each type of radio by inserting a corresponding personality module 12 and loading through conventional means a corresponding stored program for configuring test set 10 into that arrangement of test elements and instructions needed to test the particular radio with which the personality module and the corresponding software are associated. In the preferred embodiment, personality module 12 plugs into test set 10 by means of connector 31.

Figure 2:
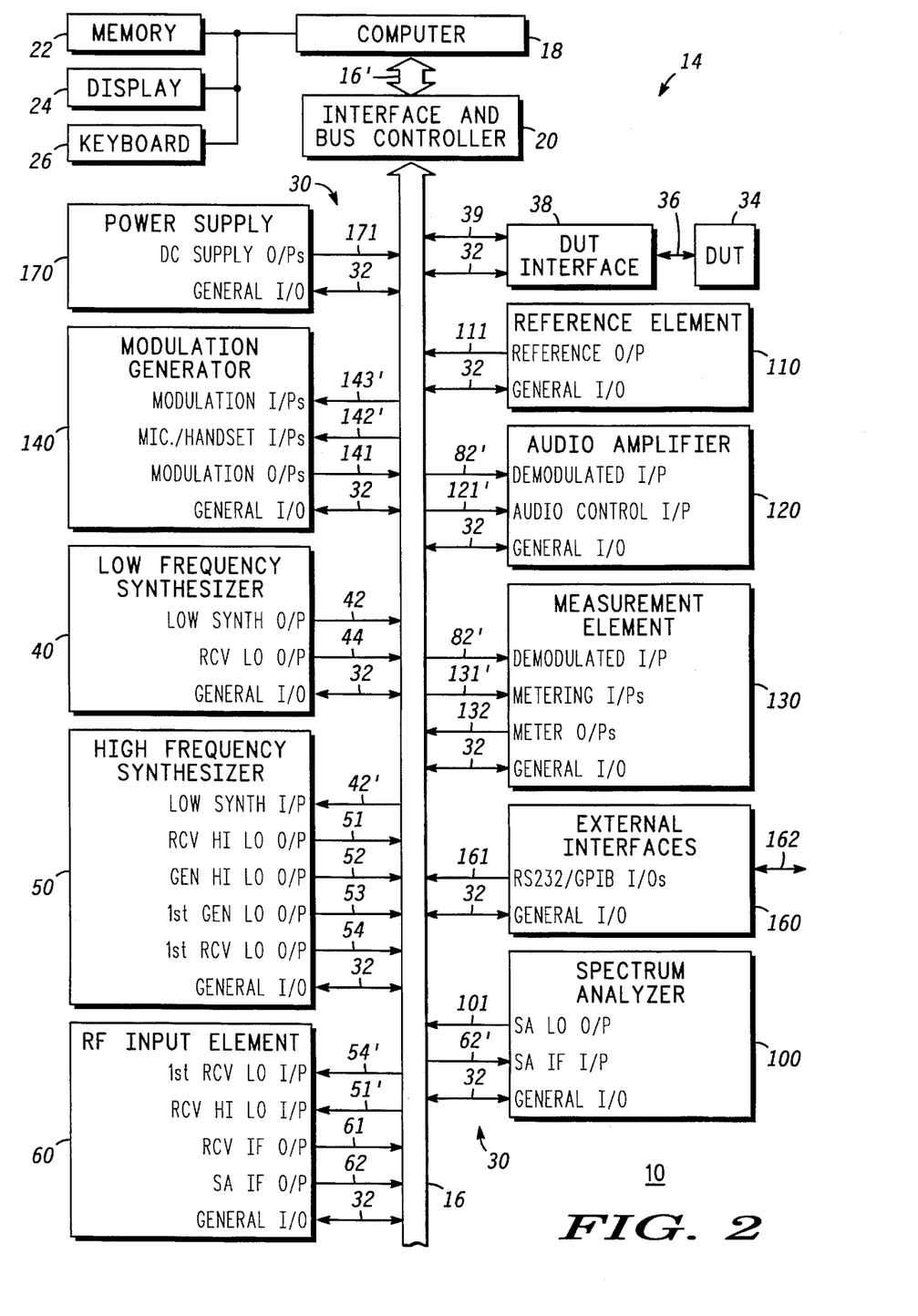
FIGS. 2 and 3 show a simplified block diagram of the common portions of a radio test set configured according to the present invention.
Figure 3:
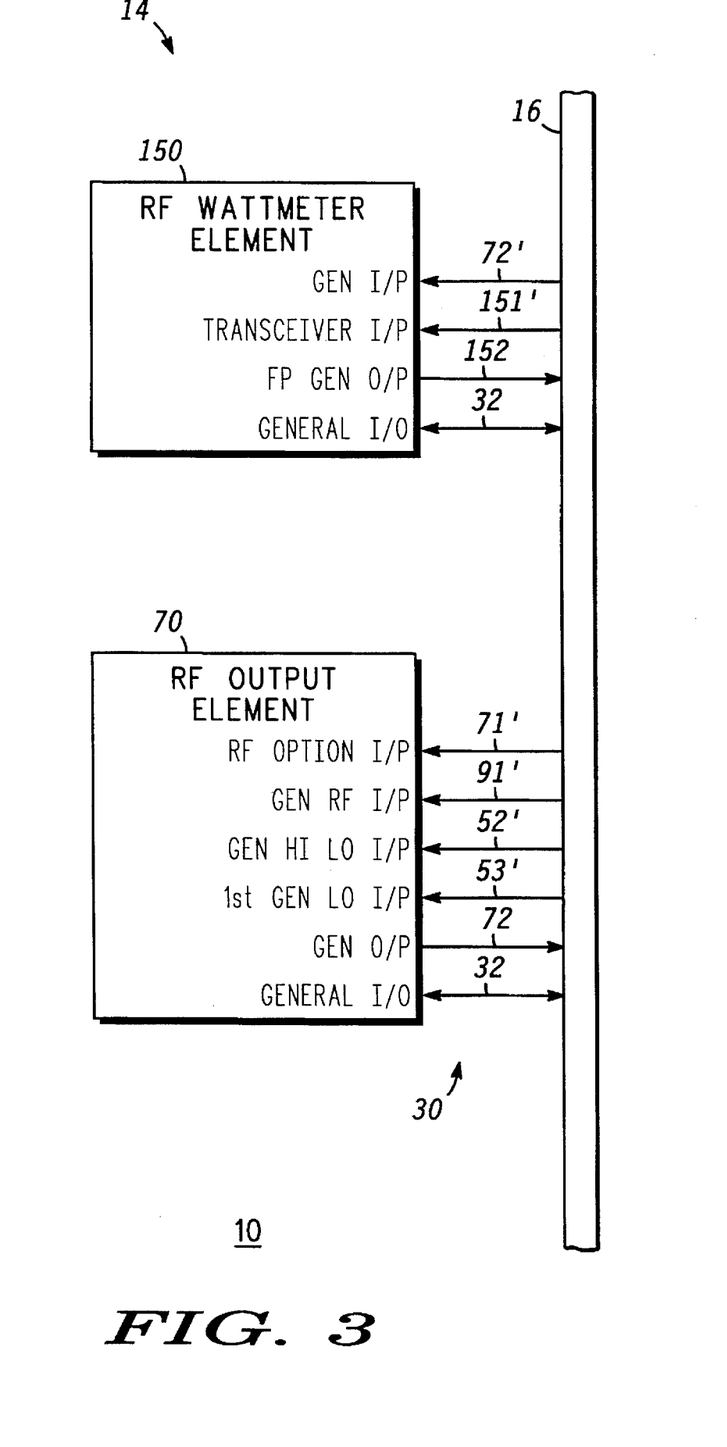
Figure 4:
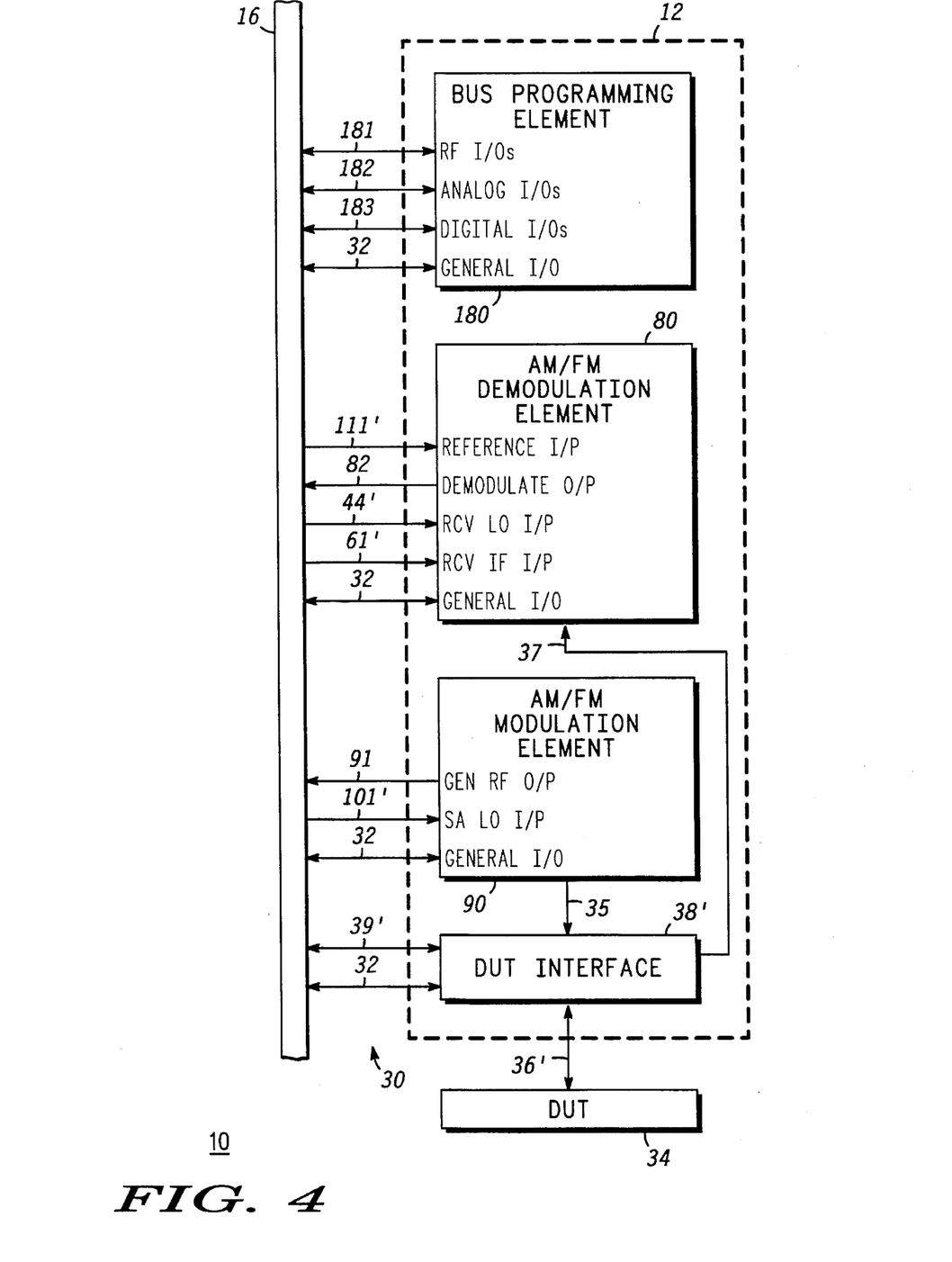
FIG. 4 shows a simplified block diagram of the radio specific portion of a test set according to the present invention as configured for the measurement of a typical Amplitude Modulation (AM) and/or Frequency Modulation (FM) radios.
Figure 5:
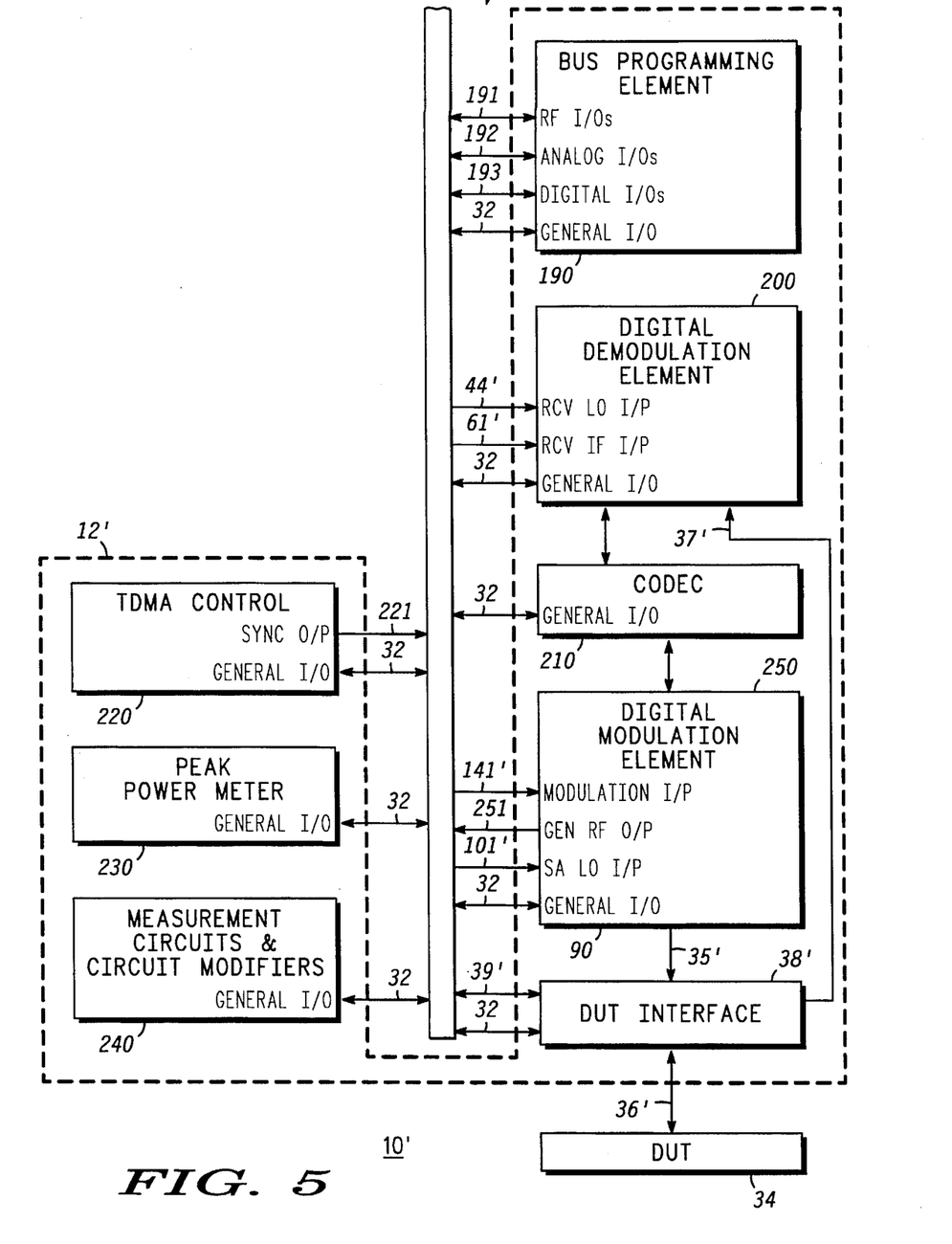
FIG. 5 shows a simplified block diagram of the radio specific portion of a test set according to the present invention as configured for the measurement of a typical TDMA North American digital cellular telephone radio.

FIGS. 2–4 show a simplified block diagram of radio test system 10 according to a first embodiment of the present invention and in greater detail, as configured for the measurement of a typical Amplitude Modulation (AM) and/or Frequency Modulation (FM) radios, and FIGS. 2, 3 and 5 show a simplified block diagram of radio test set 10' according to a further embodiment of the present invention, as configured for the measurement of a typical TDMA North American digital cellular telephone radio. These two embodiments are provided for convenience of explanation and not intended to be limiting. As will become apparent from the teachings provided herein, the present invention is adapted to permit convenient testing of a wide range of different types of radios employing many different types of modulation and signaling schemes, and is not limited merely to the examples shown here for convenience of explanation. Those elements of test sets 10, 10' in FIGS. 1–5 which are common are identified by the same reference numbers. Unless otherwise indicated, allusion to unprimed reference numbers (e.g., 10, 12, 16) is intended to include reference to their primed counterparts (e.g., 10', 12', 16').

Elements 40, 50, 60, 70, 80, 90, 100, 110, 120, 130, 140, 150, 160, 170, 180, 190, 200, 210, 220, 230, 240, 250, 38, 38' are coupled to bus 16 by lines, cables or fibers, collectively identified by reference number 30, which pass various electrical and/or optical signals, power, ground and/or other connections there between. Such signals include RF, IF, LO, analog and digital signals of a wide range of frequencies and magnitudes, according to the needs of the particular radio being tested. Connector or coupling 31 (see FIG. 1) is located in and interrupts those of lines 30 that couple from bus 16 to the elements within removable module 12, 12'.

Referring to FIGS. 1–4, radio test system 10 is divided into those common functions or elements shown in FIGS. 2 and 3 which are collectively referred to by reference number 14 and are used for all radios being tested and those elements shown in FIG. 4 within dashed lines 12 which are related particularly to the particulars of the DUT. Radio test set 10 includes bus 16, 16' for interconnection of the various parts or elements that make up radio test set 10. The operation of radio test set 10 is controlled by computer 18 which communicates with bus 16 via bus portion 16' and interface and bus controller 20. Computer 18 desirably includes memory 22, display or other annunciator 24 and input-output (I/O) device 26, as for example a key board, but any other convenient type of I/O device known in the an will also serve. Memory 22 conveniently includes bulk storage media (e.g., disk or tape) and transient or programmable storage media (e.g., RAM, ROM, EPROM, etc.) and other types of storage well known in the art. Standard commercially available apparatus may be utilized for computer 18, memory 22, display 24 and I/O device 26. A portable computer with internal and removable memory, display and keyboard are preferred.

The radio system specific components or elements of radio test set 10 are desirably contained entirely in a single plug-in module comprising the elements included within dashed outline 12, which is re/erred to herein as the personality module or the radio format module (RFM). RFM 12 provides an especially convenient way by which a user or technician can customize the test set for significantly different and incompatible radios simply by interchanging RFM 12. It is desirable that RFM 12 be able to be changed while the radio test set 10 is powered up and in operation, but this is not essential. Computer programs operating computer 18 and controlling test set 10 to perform the measurements on the DUT ,interrogate RFM 12 using any convenient code, memory or identification method and/or index. Providing a unique identification within RFM 12 permits the programs controlling operation of test set 10 to be written in such a manner as to customize the overall function of radio test set 10 to the DUT based on RFM 12. When RFM 12 is changed, computer 18 recognizes the new RFM and automatically or manually reconfigures radio test set 10 for the intended DUT, for example, under the control of an internal software program specific to the new DUT. In the preferred embodiment, the unique identification carried by RFM 12 includes a memory address which computer 18 uses to retrieve from memory 22 the appropriate instructions needed to reconfigure and operate test set 10 for the intended DUT or, alternatively, to command the user to load a particular test program which may be contained in memory accessible to computer 18.

In the preferred embodiment of the invention, common resources or elements 14 and the elements within RFM 12 are interconnected by mixed signal interconnection bus 16. Those of skill in the art will understand based on the description herein that portion 16' of bus 16 coupling computer 18 to interface unit and bus controller 20, will generally differ in the number and type of lines and signals from the remainder of bus 16. Bus 16 is desirably programmable, that is, able to be reconfigured to interconnect various common and DUT specific modules under hardware or software control. Common measurement elements 14 are test and measurement sub-systems of functions which provide generic stimuli for and perform generic measurements on the DUT. Examples of genetic measurement elements are frequency sources, reference oscillators, local oscillators, amplifiers, digitizers, digital voltmeters, RF power meters and similar equipment whose functionality is generally required for any DUT. Included within common resources 14 are those elements or functions which are utilized by other test elements but which, in general, do not perform direct measurement or signal generation. Examples are power supplies, computers, microprocessors, memory, software or firmware programs, displays, digital interfaces, converters, microphones, antennae, speakers, keyboards and the like.

RFM 12 contains those elements of test set 10 which provide radio specific test functions or performance. Typical elements in RFM 12 are modulators, demodulators, filters, signal conditioners, decoders, encoders, synchronizers, triggering circuits and/or any other radio specific analyzers and/or measuring devices which are required for proper evaluation of a specific radio's performance. In the preferred embodiment, a particular test element need not be contained in its entirety on RFM 12. Only that portion of the element which is not common to all radios need be located in RFM 12. For example, signal conditioning and filtering can be executed in part using circuits contained in common portions 14 and, in part, using elements contained in RFM 12.

Interconnection bus 16 provides a means of interconnecting the elements within radio test set 10. In one embodiment of the invention, interconnection bus 16 comprises digital, analog and RF signal lines, some of which may have dedicated routing and some of which may have programmable routing, according to the nature of the radios desired to be tested. For example, suppose that common signal generation and measurement elements 14 include two frequency synthesizers designated as Frequency Synthesizer A (FS-A) and Frequency Synthesizer B (FS-B). Further suppose that in order to obtain a particular frequency range or resolution, the operator desires to utilize FS-A as the RF signal source for a particular DUT, e.g., designated as DUT-A, and to utilize FS-B as the RF signal source for a different DUT, e.g., designated as DUT-B. In both cases, FS-A or FS-B provides an RF signal to the RFM to exercise the DUT. Selection of which of the common elements FS-A or FS-B will be used is conveniently accomplished by using two RFMs, one for each DUT. For example, on RFM-A, the RF signal connection is taken from the bus lead carrying FS-A and on RFM-B, the RF signal connection is taken from the bus lead carrying FS-B. These connection may be hard wired into the RFMs, for example, by having the RF signal lead in the RFM wired to the appropriate pin on the multi-pin connector 31 (see FIG. 1) by which the RFM plugs into bus 16 so that in RFM-A it is connected to the FS-A bus lead and in RFM-B it is connected to the FS-B bus lead. Such programmable connections are conveniently provided by Bus Programming Element 180 (or 190) directly or under its control. The actual connection via connector 31 to bus 16 may be located anywhere within RFM 12.

Alternatively, connection to FS-A or FS-B may be accomplished under program control by computer 18, for example, by closing one or more RF switches (not shown) feeding to or from bus 16 so that one or the other or both of FS -A or FS-B reach RFM 12. This is preferred when it is desired, e.g., for purposes of extended frequency range, to use multiple RF sources in evaluating the DUT. Insertion of RFM-A or RFM-B can automatically trigger the appropriate switch closures or switch closure programs, as will be subsequently explained in more detail. Solid state switches to accomplish such variable connections are well known in the art. They are desirably located on the RFM so that the common elements may remain as simple as possible with the customization elements being carried by the RFM, but this is not essential.

When it is desirable to vary the modulation signal being provided using the modulation capability contained within common measurements sub-system 14, this is conveniently accomplished, for example, in substantially the same manner as described above for the RF sources, that is, by making a hard wired connection in the RFM or by means of program control. If the desired modulation is not available within common elements 14, then it is provided within RFM 12, or RFM 12 contains causes computer 18 to reconfigure the common and or DUT specific elements to provide the desired modulation. This is desirable for evaluation of DUTs requiring complex modulation methods.

Bus 16 provides a means by which signals generated by either common elements 14 or by specific elements within RFM 12 are distributed to others of common elements 14 or specific elements in RFM 12. It will also be understood by those of skill in the an based on the teachings herein, that certain signals may be "loop-through" signals, that is, originating within one of common elements 14, then passing along the bus to a specific element within RFM 12 and then returning from RFM 12 to bus 16 (e.g., on a different lead) for communication to a different common element 14 or vice versa (e.g., from an RFM element to the bus, then to a common element, then back to the bus, then to the same or a different RFM element). By including within RFM 12 the connections or instructions that provide for a loop-through, the configuration of test set 10 may be further altered to suit the needs of a particular DUT. An example is the use of wide-band IF circuits within elements 14 (so as to be able to accommodate a wide range of IF frequencies) and narrow band IF circuits within module 12. For example, an IF signal generated within portion 14 of test set 10 is routed to RFM 12 wherein it passes through comparatively narrow IF filters appropriate to the DUT and the filtered signal is then returned to one or the other of elements 14 before being passed back to module 12 for further processing, or is used directly within module 12 after such filtering. Such examples are intended to be illustrative and not limiting.

While bus 16 may be a fixed bus, that is, having a predetermined arrangement of digital, analog, RF, IF, LO, etc. signal and control lines (as well as power and ground, etc.) appearing on particular leads of the bus connector, wherein selection of the appropriate signal and control lines is made, for example, by connecting or not connecting (e.g., within the RFM module) to the appropriate contacts of RFM bus connector 31, it is more desirable that bus 16 be programmable. Bus 16 may be made programmable in a number of ways. For example, common elements 14 and the elements within RFM 12 may be coupled to bus 16 by electrically controlled (e.g., digital) switches actuated by means of control signals generated by computer 18 and passed along control lines of bus 16, wherein each element has a unique switch address or by signals provided by Bus Programming Element 180, 190, or a combination thereof. Such switches would be inserted, for example, in leads 30 extending between elements 14 and/or RFM 12 and bus 16. Alternatively, the bus may be formed from a two (or more) dimensional cross-bar switch whose internal connections are programmed in much the same way as in a telephone exchange.

Suitable bus switching elements are well known in the art, as for example, solid state switches and multiplexers for analog, RF and digital functions and Electrically Erasable Programmable Logic Devices (EEPLDs) or Reprogrammable Field Programmable Gate Arrays (FPGAs) to implement other digital interconnection. Any suitable switches may be used consistent with the nature of the signals being carried.

By use of the above-described programmable bus and provided that the requisite number of signal and control lines exist within the bus, the function of test set 10 may be entirely programmed under software control and each test element (whether common or specific) engaged, disengaged, modified or controlled at will. Thus, great flexibility of test function is obtained and the current practice of physically re-wiring the element-to-element interconnections to be able to test different radios is entirely avoided. A further advantage of the above-described arrangement is that this flexibility permits radio test set 10 to readily adapt to new radios and signaling schemes yet to come into use. Functions required by such radios and not present within the existing common elements, may be provided by means of an appropriate RFM. This is a particular feature of the present invention.

Desirable Test Elements and Physical Configurations

In many modem radio systems, it is desired to transmit the information in digital form. When two computers are communicating, the data is already in digital form. However, when the information being transmitted is, for example an analog audio voice signal, then the analog signal must first be digitized using an Analog to Digital Converter (ADC) prior to transmission. In addition, the received signal must generally be resynthesized using a Digital to Analog Converter (DAC) for it's intended use at the receiving end. These conversions between the analog and digital are usually performed in conjunction with a coder-decoder unit (i.e., a CODEC) which removes a large amount of redundant information from the analog signals prior to transmission, and hence further increases the spectral efficiency. In general, the CODECs used in modem radio systems must be specifically tailored to the system to maximize performance and throughput. This means that CODECs manufactured for one radio system typically cannot be used to encode or decode signals for a different system unless the systems were specifically designed to be compatible with one another or to use common CODECs. An advantage of the present invention is that it allows a single basic test set to accommodate many different CODECs by incorporating the CODEC in the RFM.

Central to any radio test set 10 is a basic receiver capable of receiving and demodulating the radio communications and a basic transmitter capable of generating modulated RF signals to be transmitted to the DUT. The DUT typically comprises a radio system, an individual radio intended to operate within that system or any sub-system or component contained within the said radio or radio system.

In addition, radio test set 10 typically also includes test elements to analyze the quality of the transmitted and received signals, as for example, a modulation analyzer to analyze the characteristics of the modulated signals, an audio frequency (AF) frequency counter for measurement of demodulated and audio frequencies, a signal-to-noise and distortion (SINAD) meter for measuring noise performance of the receiver and/or transmitter sub-sections, a distortion meter for measuring audio frequency distortion, a bit error rate (BER) meter for measuring the incidence of digital errors in the demodulated digital signals and any other meters, indicators or analyzers appropriate for the analysis of baseband signals in the DUT.

In addition, radio test set 10 typically also include test elements to analyze the quality of radio frequency (RF) and intermediate frequency (IF) signals transmitted from or received by the DUT. For example, radio test set 10 may include an RF power meter to measure absolute or relative RF power levels within the system or within the DUT, an RF and/or IF frequency counter for the measurement of frequency and frequency deviations in the RF and/or IF signals, a spectrum analyzer for selective measurement of the absolute or relative levels of the frequency components comprising the RF and/or IF signals in the DUT, a tracking and/or sweep generator to permit swept measurement of the RF characteristics of the DUT, a modulation generator for the generation of either digital modulation and/or audio frequency modulation to be used to modulate the RF transmitter, a signal strength meter to measure broadband RF and/or IF signal strength and any other meters, indicators, analyzers or generators appropriate for generation or analysis of the RF and/or IF signals in the DUT.

In addition, radio test set 10 typically also includes general purpose test elements to analyze the quality of various signals which might be present in the DUT. For example, radio test set 10 may include a digital multimeter for measurement of AC and DC voltages, currents and resistances which might be present in the DUT, an analog or digital oscilloscope for display, measurement and analysis of low frequency digital and analog signals within the DUT, a function generator for the creation of low frequency stimuli having various wave shapes, a word generator for the creation of digital word streams, a logic analyzer for the analysis of low frequency digital data and any other meters, indicators, analyzers or generators appropriate for generation or analysis of low frequency general signals within the DUT.

In general, the collection of generators, analyzers, meters, displays and indicators comprising radio test set 10 operate in close conjunction with each other within radio test set 10 in a manner which is best suited for the measurement of the specific DUT. For example, in the measurement of a full-duplex radio or radio system, the transmitter and receiver in radio test set 10 are desirably automatically tuned to the correct duplex offset frequencies for the DUT, e.g. by operation of the controlling software communicating appropriate commands along bus 16 to the frequency generating elements. As the transmitter frequency is changed, say for transmission on another channel, the receiver frequency desirably is also automatically changed by radio test set 10 so that the receiver is automatically tuned to the correct channel. The ability of radio test set 10 to provide such automatic realignment or reconfiguration of the test functions under programmable software control greatly simplifies the process of measurement and alignment of the DUT.

In addition, the test elements comprising radio test set 10 may be physically integrated into a small and light weight assembly. Often portions of a radio System such as base stations and repeaters are geographically located in remote and inaccessible locations such as mountain tops or on the roots of tall buildings. For these and other reasons, it is highly desirable that radio test set 10 be sufficiently portable so that it can be easily carried using a single hand.

To achieve a minimum of size and weight and for economic considerations, the test elements within radio test set 10 are generally designed to share as much common circuitry and elements as possible within the constraints of the measurements to be made on the DUT. A typical example of the use of common circuitry within radio test set 10 is to use a single frequency synthesizer to provide the fundamental RF signal to each of the transmitter, receiver and spectrum analyzer elements. Another example is that it is desirable for all the test and measurement equipment to share a single common computer, memory and visual display, as is provided by radio test set 10.

Example of the Test Elements and Test Set Operation

FIGS. 1–4 illustrate a simplified block diagram of radio test set 10 suitable for use to measure the performance of a typical simple AM or FM Radio or Radio system. DUT 34 is coupled to system 10 by lead 36, 36' and DUT interface element 38, 38', which in turn is coupled to bus 16 by lead 39, 39'. Either interface and its associated leads may include RF or other radiative coupling or optical fiber coupling, and reference to lines 36, 36' and 39, 39' is intended to include such other means of coupling. For example, where test set 10 is evaluating the performance of DUT 34 as a transmitter or receiver of RF signals, it is desirable that test set 10 act as a radio receiver or transmitter of corresponding RF energy via radiative coupling to DUT 10.

DUT Interface 38 is shown as a part of common elements 14 and DUT interface 38' is shown as a part of RFM 12. Either arrangement may be used. Alternatively, some signals from DUT 34 may be fed into test set 10 via DUT interface 38 and some via DUT interface 38', depending upon the particular DUT. For example, if it is desirable that DUT 34 and DUT interface 38' couple directly to Demodulation Element 80 and/or Modulation Element 90 in RFM 12, then having DUT interface within RFM 12 is advantageous. If the signals being exchanged with DUT 34 do not require direct access to RFM 12 then, having DUT Interface 38 as a part of common elements 14 is advantageous. Similarly, some signals (e.g., RF signals) may pass through DUT interface 38' while other signals (e.g., control signals) may pass through DUT interface 38. Either arrangement serves. Thus, DUT Interfaces 38, 38' are desirably included within common elements 14 and optionally included within RFM 12 depending upon the type of DUT for which test set 10 and RFM 12 are intended.

Radio test set 10 is organized around bus 16 which comprises a plurality of digital, analog and RF signal lines as well as DC and/or AC power supplies lines. Bus 16 may comprise in excess of one hundred discreet interconnecting signal lines, depending upon the test set capability desired. Due to the large number of potential interconnecting signal lines 30, only specific interconnecting signals particular to the use of RFM 12 will be described, the remainder being shown as General I/O signals or lines 32. General I/O signals 32 may comprise digital, analog and RF signals of a wide and varied nature, such as, digital outputs, digital inputs, bi-directional digital lines, open-collector or open-drain digital lines, analog inputs, analog outputs, analog busses, analog summing junctions, RF inputs, RF outputs, multiplexed RF I/O lines, AC and DC power supply lines and such other signal, power or control lines as are needed to operate radio test set 10 and the specific RFM being employed. The exact makeup of General I/O signal lines 32 will depend upon the specific test elements chosen by the designer for incorporation in test set 10. For example, if a particular signal generator requires 2 I/O leads and 2 control leads, then such leads need to be coupled to the bus, either explicitly or as a pan of General I/O leads 32. Persons of skill in the an will understand, based on the explanation herein and the chosen test elements, what signals and other lines need to be included in General I/O 32 for the particular DUT of interest.

Radio test set 10 conforming to the architecture of FIGS. 1–4 may be implemented using a wide variety of design variations, but for the purpose of this explanation one particular variation will be described. Such description is provided for convenience of explanation and is not intended to be limiting. The following convention is adopted with respect to individual lines 30 and the signals thereon. Those signal lines representing outputs of test element are identified by unprimed reference numbers and those representing inputs to test elements are represented by primed reference numbers. For example, low frequency synthesizer 40 provides Low Synth Output 42 which appears as Low Synth Input 42' at high frequency synthesizer element 50, the reference numbers 42, 42' indicating that it is the same signal. Bi-directional lines are identified by unprimed numbers.

Low frequency synthesizer 40 comprising four phase lock loop synthesizers and associated circuits is provided to generate a variety of low frequency RF signals for use in the system. In particular, Low Synth Output (O/P) signal 42 provides a high quality RF signal tunable, for example, over the range of 100.0000 to 119.9999 MHz at a signal level of approximately −2 dBm. Additionally, synthesizer 40 provides Receiver Local Oscillator Output (RCV LO O/P) 44 generating a 321.4 MHz fixed frequency RF signal at a power level of approximately −2 dBm which is used by the Demodulation Element 80.

High frequency synthesizer 50 is included to provide the RF signals required by radio test set 10. The high frequency synthesizer conveniently comprises two or more phase locked loop synthesizers whose outputs are combined with the output of the low frequency synthesizer generator to produce four RF frequency signals 51, 52, 53, 54, respectively as follows: (i) RCV HI LO (51) at 1400 MHz and (ii) GEN HI LO (52) at 1400 MHz which are used to provide the Local Oscillator signals to RF Input Element 60 and RF Output Element 70, respectively, and (iii) 1st GEN LO (53) tunable from 2710 MHz to 1700 MHz and (iv) 1st RCV LO (54) which are provided to the front end of the elements 70 and 60, respectively. This allows the transceiver RF signals to be superheterodyned down using a technique known as high-side mixing.

The RF signals to and from DUT 34 are coupled via lines 36, 36' and DUT Interface 38 and lines 39, 39' to bus 16 and thence to other elements, or to Demodulation Element 80 and Modulation Element 90 directly via lines 37, 35. The signals from DUT 34 may go directly to bus 16 from DUT interface 38 or pass through RFM 12 via DUT interface 38'. RF Input Element 60 performs the first level of signal conditioning on the RF input signals received via DUT interface 38, 38' and bus 16 from DUT 34, and the first and second down conversions. The RF signal passes through a multi-stage switched gain RF amplifier (e.g., in DUT interface 38, 38') to provide suitable attenuation or gain. The RF signal is then mixed down, using the high-side mixing technique to produce a 310.7 MHz RCV IF and a 310.7 MHz SA IF for use by Demodulation Element 80 and Spectrum Analyzer 100, respectively. Spectrum Analyzer Element 100 produces Spectrum Analyzer Local Oscillator output (SA LO O/P) signal 101 which goes to Modulation Element 90 and is used to produce GEN RF O/P signal 91. Modulation Element 90 receives SA IF I/P signal 62' from RF Input Element 60. Spectrum Analyzer Element 100 detects the level of the SA IF I/P signal 62' and communicates this level to computer 18 via General I/O line 32 and bus 16.

Demodulation Element 80 is provided to perform the final down conversion to a the final IF signal, filtering and demodulation to provide the baseband signal. Demodulation Element 80 comprises a 2nd IF mixer which mixes RCV LO FP 54' from Low Frequency Synthesizer Element 40 with RCV IF I/P 61' from the RF Input Element to produce a 10.7 MHz 2nd IF signal. This signal is fed into a gain controlled IF amplifier chain which incorporates switched bandwidth IF bandpass filters with bandwidths selectable as 280 kHz, 17 kHz and 7.5 kHz. The output of the IF filters is down-converted again using the Reference O/P 111' from the Reference Element 110 to a final IF frequency of 700 kHz. This final IF is AM detected using a closed-loop AGC detector, and also FM detected using a pulse counting discriminator. Depending on the radio type, one of the two audio outputs is selected by an audio multiplexer and output as signal 82, 82' to Audio Amplifier Element 120 and Measurement Element 130.

Modulation Element 90 generates a 310.7 MHz modulated RF output (GEN RF O/P) signal 91 where the RF modulation is either AM or FM depending on the radio type. This is implemented using a Phase Lock Loop (PLL) synthesizer, two mixers and a balanced modulator with associated filters and matching circuits. The second mixer uses the SA LO I/P signal 101' from the Spectrum Analyzer Element 100 output 101 as a Local Oscillator. This ensures that the output frequency of Modulation Element 90 is swept appropriately when Spectrum Analyzer 100 is tuned. The modulation is derived from an audio signal from Modulation O/P signal 141 of the Modulation Generator Element 140. Modulation signal 141 is conditioned and then used to drive the balanced modulator if the AM modulation type is selected. Otherwise the signal is used to tune a suitably linearized Voltage Controlled Oscillator (VCO) and the output of the VCO is mixed into the Generator output 91 if the FM modulation type is selected.

The RF Output Element 70 is provided to up-convert and amplify or attenuate GEN RF I/P signal 91' from the Modulation Element 90. RF Option I/P 72' is also provided to use an optional alternate generator which might be provided eternally or as an additional assembly. The 310.7 MHz RF Input signal level is controlled using a switched RF attenuator. The signal is then up-converted using the GEN HI LO I/P signal 52' at 1400 MHz to generate a 1710.7 MHz IF signal. This signal is then low side down-convened using a second mixer with the 1st GEN LO I/P signal 53' at 1700–2710 MHz as a Local Oscillator. This produces a 10 MHz–1000 MHz high quality modulated RF signal which is amplified to produce the Generator RF Output signal, GEN O/P 72.

RF Watt meter Element 150 combines and measures the RF power level of both the incoming RF signal incident on Transceiver I/P line 151' and the Generator Input, GEN I/P 72'. In Full Duplex operation both the incoming and outgoing signals may utilize the same transceiver port. However, RF switches are provided which may also re-direct GEN I/P signal 72' to an alternate connector FP GEN O/P line 152.

Reference Element 110 comprises a precision 10.000 MHz frequency reference (Reference O/P 111) which is used by the synthesizers and other RF circuitry as the fundamental frequency reference.

Modulation Generator Element 140 is used to provide a Modulation Output 141 to be used as the baseband modulation for the transmitter described. The modulation signal is selected from either a microphone or handset Input 142 or any type of synthesized modulation signal (e.g., Modulation I/P signal 143) which is generated using a general purpose tone modulation synthesizer (not shown) or other convenient means.

Measurement Element 130 comprises, for example, a sampling digital oscilloscope, digital voltmeter (DVM) and various other meters and analyzers suitable for measurement and analysis of the quality of the received baseband signal. The input to Measurement Element 130 is selected from one of Metering I/P signals 131 or Demodulated Signal I/P 82' using a high performance analog multiplexer. The selected signal can then be either measured precisely using the internal DVM or digitized for digital analysis and display using the optional internal digital oscilloscope. Metering O/Ps 132 are provided to drive appropriate meters and displays for the operator interface.

Audio Amplifier Element 120 is used to generate an audible audio signal from the Demodulated I/P 82'. The audio characteristics of the signal are amplified and controlled using Audio Control I/P signal 121', which allows the squelch and volume of the signal to be adjusted. Audio Control I/P 121' is derived from computer 18 via bus 16. The amplified audio may then be connected to the internal speaker or a headset under the operator's control.

Interface Element 160 with I/Os 161 and 32 provides signal conditioning and amplification to the digital interface signals being coupled to the transmitter and receiver sections from external sources. Interface Element 160 provides remote programming, measurement and data input capability to radio test set 10. Computer 18 and test elements 12, 14 can communicate with other external apparatus via interface 160 using general (digital) I/O 162, which signals are converted in Interface Element 160 into the appropriate RS232 or GPIB FO signals 161 required to interface to bus 16. Computer 18 can also independently communicate with external apparatus through its own FO ports, either serial or parallel, using techniques well known in the art.

Control and measurement of the signals in radio test set 10 is performed under the direction of computer 18. Computer 18 desirably includes a high performance microprocessor, as for example, of the types used in modem personal computers and/or work stations. Computer 18 also desirably includes all necessary supporting elements for digital processing, such as RAM, NVRAM, interrupt controllers, digital timing and handshaking circuits and ROM and/or EPROM and archival (e.g., disk or tape) storage to retain stored computer program which comprises the radio test set software and firmware. Computer 18 desirably includes a CRT or LCD display (e.g., part of I/O 26) and the requisite drive and refresh circuits and a keyboard.

Power Supply Element 170 provides a wide range of DC Supply O/Ps 171 needed to operate the other modules. In addition, signals indicating the quality of the power supplies are communicated to the microprocessor section using General I/Os 32 of module 170.

AM/FM Radio Format Module 12 comprises a Bus Programming Element 180, AM/FM Demodulation Element 80 and AM/FM Modulation Element 90. Other test elements which might be included in RFM 12 (e.g., for purposes of module standardization) but which are not required for testing of the exemplary simple AM/FM Radio System, are 'jumpered out' or otherwise inactivated by Programming Element 180.

Bus Programming Element 180 conveniently has a set of hard-wired or programmable jumpers which re-route RF I/O signals 181, Analog I/O signals 182 and Digital I/O signals 183 in a manner appropriate for the AM/FM Radio intended to be tested. For example, RF Watt meter transceiver input 151' may be routed through Programming Element 180 back to the internal CW power detection circuits contained in the RF Watt meter Element 150.

AM/FM Demodulation Element 80 in RFM 12 provides the functions of a demodulator and resembles generally a conventional AM/FM receiver-demodulator such as is used in prior an radios or test sets, with the exception that its Inputs and Outputs are not hardwired directly to or from generic test instruments. Rather, their routing is determined by Bus Programming Element 180 in combination with computer 18 so as to supply the specific capabilities and/or test routines required by the DUT. AM/FM Modulation Element 90 in RFM 12 provides the functions of a modulator and resembles generally a conventional AM/FM generator-modulator such as is used in prior art radios or test sets, with the exception that it's Inputs and Outputs are not derived directly from or hardwired to the generic test instruments. Rather, their routing is determined by Bus Programming Element 180 in combination with computer 18 so as to supply the specific capabilities and/or test routines required by the DUT.

In the preferred embodiment, Radio Test Set 10 employs a commercial laptop computer for computer 18. This facilitates customization of the internal software programs. Modem laptop computers such as, for example, portable personal computers and work stations manufactured by IBM, Inc., Apple Computer, Inc. and others have advanced operating systems and peripheral devices which readily permit re-programming of the user interface through well established means. They provide for both internal transient storage via RAM and for more permanent storage via archival data and program storage on disks and tapes and by firmware stored in ROMs and EPROM and variations thereof. Computer 18 is conveniently interfaced to the bus 16 via Interface Controller 20 using, for example in bus portion 16', standard interfaces such as SCSI, ESDI, DE, PCMCIA or one of several common variations of parallel port interface. An important design feature of Radio Test Set 10 is that the software programs required to operate Test Set 10 are conveniently retained in the mass storage portion (e.g., disk or tape) of memory 22 within only a small boot download program retained in storage within EPROM or ROM within memory 22 in computer 18 or, alternatively, elsewhere within portion 14 of Test Set 10. This permits the entire portion of the Radio Test Set software associated with measurements of radio characteristics to be modified with exceptional ease and a minimum of expense. Further, even remotely located test sets may have their controlling software up-dated without actual physical access thereto.

As has been previously noted, insertion of a particular RFM 12 into test set 10 desirably causes test set 10 to be automatically (or semiautomatically) reconfigured for testing the particular types of radios corresponding to that particular RFM. This may be accomplished in any number of ways. In the preferred embodiment, computer 18 routinely polls bus 16 to determined whether an RFM is connected thereto. Alternatively, insertion or removal of the RFM can generate an interrupt on bus 16 whereby computer 18 is advised that RFM 12 is present or absent. When Computer 18 detects the presence of an RFM, it interrogates the RFM to determine an identifier (D) stored in the RFM. As used herein the words "interrogate" or "poll" or "detect" in connection with determining the presence (or absence) of RFM 12 or the ID associated therewith, are intended to include any means for receiving or determining such information.

The ID of RFM 12 may be stored in Bus Programming Element 180 or elsewhere in RFM 12. The D is, for example, a digital number and/or letter-number combination or as a resistor value or as a switch setting or as the presence of a predetermined circuit or function or capability provided thereby or any combination thereof, that is different for each type of DUT and its associated RFM. Computer 18 then uses the ID to retrieve from memory 22 a computer program that instructs computer 18 on how to configure the various general purpose test elements 14 within test set 10 and/or the various special purpose test elements with RFM 12, to provide the test functionality desired for the DUT associated with the particular RFM which has been inserted in radio test set 10. In the same manner, computer 18 can extract from memory the test routines that are typically desired to be used with the particular DUT to be connected to its corresponding RFM.

While in the preferred embodiment, insertion of a particular RFM 12 causes test set 10 to automatically be reconfigured and load the desired test programs, those of skill in the art will understand based on the description herein that each step in this process can be subject to operator control. For example, the RFM ID or a sub-ID can be entered from computer I/O 26 rather than being completely stored in RFM 12. Capability for both methods of identifying RFM 12 to test system 12 is convenient. This allows, for example, the use of RFMs that have a base ID but which are partially operator programmable, as for example, by setting various jumpers or switches provided therein or by inserting various local personality chips or modules (e.g., EPROMs, ROMs, switch boards, etc.) or a combination thereof which would allow the user to add additional functionality or introduce specialized test configurations or routines that are remembered by the RFM. When inserted into the test set, the operator would then enter the sub-ID that would identify the unique modifications made by the operator. Alternatively, the sub-ID can also be stored in the RFM and the computer program instructions corresponding thereto entered and stored by the user in computer 18 for recall when the sub-ID is detected by computer 18. Providing the RFM modules with a unique ID and/or sub-ID related to the configuration and test routine software stored in memory 22 computer 18 is a feature of the present invention. Alternatively, the sub-ID may cause test set 10 to interrupt the programmed test routine to request a specific input or action by the operator. Many combinations are possibility because of the inherent flexibility of the above-described architecture.

FIGS. 1–5 show a simplified block diagram of Radio Test Set 10' suitable for use to measure the performance or a typical TDMA North American digital cellular telephone radio. It will be noted that portion 14 of test set 10' (see FIGS. 2 and 3) is the same as portion 14 of test 10 in FIGS. 1–4, that is, common elements 14 need not be changed in order to reconfigure test set 10, 10' to test a radio having very different operating characteristics. All of the modifications necessary to reconfigure test set 10 from, for example, a configuration for testing a simple AM/FM transceiver, to test set 10' adapted to test a TDMA cellular radio, is accomplished by changing RFM 12 to RFM 12', and loading the software corresponding to RFM 12'.

Referring now to TDMA Radio Format Module 12' in FIG. 5, it is seen that all the circuits or test elements specifically required to perform measurements on TDMA Radios and Radio Systems have been conveniently encapsulated into the single module. The common use elements are provided by portion 14'.

Bus Programming Element 190 is analogous to Element 180, but with functions appropriate to a TDMA radio, as is further explained. Digital Demodulation Element 200 is conveniently a general purpose TDMA Measurement Receiver which performs the down conversion to the final IF and provides appropriate IF filtering. The final IF is digitally demodulated to generate a continuous binary bit stream for baseband signal processing. The first stage of this baseband signal processing is decompression using the coder-decoder unit in CODEC Element 210. If the baseband signal represents an audio signal or tone, such as voice, the decompressed data is converted to an analog signal using a high-performance digital to analog Converter (DAC). The recovered audio signal is amplified, filtered and connected to the audio measurement circuits and Audio Amplifier Element 120 by way of Bus Programming Element 190.

The entire demodulation process, including the time slice selection and synchronization, is controlled by the TDMA Control Element 220. Element 220 conveniently comprises timing circuits, a microprocessor for real-time control and signal generation, program memory and physical interfaces which permit the connection of Test Set 10 to TDMA radios, TDMA Base stations, TDMA repeaters and the like.

Modulation Output 141 from Modulator 140 is routed to the Digital Modulation Generator Element 250 by the Bus Programming Element 190. The baseband signal is digitized using a high perfonnance analog to digital Converter (ADC) in CODEC Element 210. This digital signal is compressed by CODEC 210 and output to a Digital Modulator in Digital Modulation Generator Element 250. This produces a digitally modulated IF. This IF is then further up-converted within element 250 to produce the 310.7 MHz standard transmission IF utilized by the Radio Test Set.

Because the TDMA RF signals are time-sliced, RF power must be measured using a sampling Peak Power Meter rather than a conventional CW meter, as was appropriate for AM/FM radio test setup 10 in FIGS. 1–5. In test set 10' for TDMA radios, Peak Power Meter Element 230 is included in TDMA RFM 12' to measure the RF power levels during the appropriate time-slice. The detected outputs from the RF Watt meter Element 150 are routed to the Peak Power Meter Element 230 by the Bus Programming Element 190. The Peak Power Meter samples the RF signal during the appropriate time-slice. This can be conveniently accomplished by building a complete Peak Power Meter into RFM 12', but this is not essential. Alternatively, the RFM 12' may contain only a suitably triggered sample and hold amplifier, which samples the detected signals at the appropriate instant in time. The sampled signal might is then routed to the Power Meter 150 by Bus Programming Element 190.

Synchronization circuits for the Spectrum Analyzer Element 100 are included in the Measurement Circuits and Circuit Modifiers Element 240 to permit the capture of spectral information only during the appropriate time-slice. This is achieved by supplying Sync O/P signal 221 from the TDMA Control Element 220 to Spectrum Analyzer Element 100, as for example as a part of SA General I/O 32.

Measurement Circuits and Circuit Modifiers Element 240 comprises additional generators, measurement circuits, meters or portions thereof required to permit the measurement of IF and other parameters in the appropriate time-slice and to allow the measurement of additional parameters appropriate to Digital Radio transmissions. For example, a common parameter used to indicate the quality of a digital radio transmission is the Bit Error Rate (BER). This measurement yields a statistic which correlates the number of faulty bits received to the integral number of bits transmitted. The Bit Error Rate measurement capability is desirably included in RFM 12' for digital radios. Other radio characteristics which may be evaluated using Element 240 in cooperation with the other test elements provided in portion 14 and 12 are, for example, frequency error, phase modulation error and, in the case of CDMA radios, the signal quality ("Rho"). These may be accomplished using techniques well known in the art. Connections to the circuits comprising Element 240 are routed by or under the control of Bus Programming Element 190.

Figure 6:
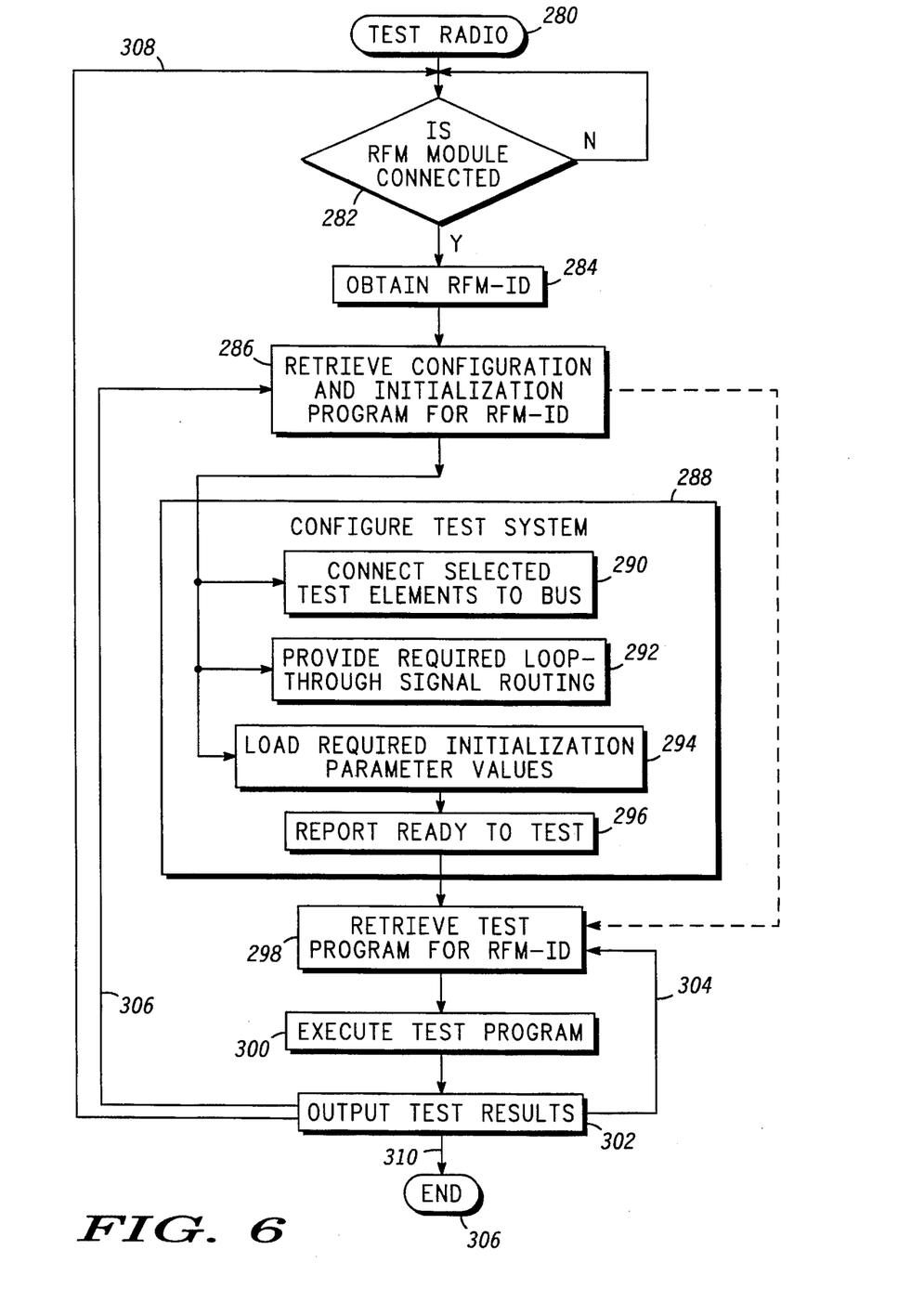
FIG. 6 is a simplified flow chart illustrating a first embodiment of the method of the present invention.

FIG. 6 is a simplified flow chart illustrating the method of the present invention. Radio test sequence 280 is initiated by first determining in step 282 whether or not an RFM 12 has been coupled to tester 10, as for example by inserting it in a slot in tester 10 and so that it engages connector 31. Any convenient means for testing for the presence of RFM 12 in tester 10 may be used. If the answer determined in decision step 282 is "no", then the process loops back to repeat decision step 282. Step 282 may occur at intervals determined by the user or by a stored sub-routine which, for example, loads automatically on power-up of tester 10.

If the outcome of step 282 is "yes", then computer 18 obtains in step 284 the ID of RFM 12 which has been coupled to tester 10, and in step 286 uses this ID to retrieve a corresponding tester configuration and initialization program (i.e., how the test elements should be interconnected and initialized). Tester 10 may then or later execute step 298 to retrieve a test program corresponding the ID retrieved for RFM 12 as indicated by the dashed line connecting steps 286, 298. Following step 286, computer 18 executes step 288 to configure test system 10 with, to the extent required for the particular RFM that has been inserted, the participation of Bus Programming Elements 180, 190 on RFM 12. Step 288 conveniently comprises sub-steps 290, 292,294 which may be executed sequentially or, as shown, in parallel. In step 290 computer 18 acting under the direction of the retrieved program sends signals along the control paths of bus 16 to activate those switches provided in conjunction with elements 12, 14 needed to couple those of element 12, 14 required to test the identified RFM to the bus (and thereby to each other) in the proper combination required by the identified RFM. RF, IF, LO, analog and digital signals are among those which may be looped-through from elements 14 to elements 12 and back to elements 14, or any combination or inversion thereof, depending upon the particular test desired to be performed.

In step 292, which may be performed in parallel with step 290, 294 or after step 290, the loop-through signal routings needed to obtain the desired signal conditioning and perform the desired tests on the identified RFM are also completed. In step 294, which may be performed in parallel with or after steps 290, 292, the appropriate initialization values are loaded into the test elements which require such. For example: a test element providing digital volt-meter capability can be set to a particular range by loading an appropriate range-setting initialization value; a phase-lock-loop (PLL) signal generator whose output frequency is controlled by selecting one or more divisors can be set to provide a particular frequency or sequence of frequencies by loading the appropriate divisors into programmable dividers of the PLL or registers feeding the dividers; and if the radio being tested includes a encryption device, an encryption key and/or an encryption starting string may be loaded into the appropriate registers feeding the encryptor.

Whichever is the last performed of functions 290, 292, 294 (e.g., step 294) causes step 296 to report that test set 10 is configured and ready to test. This report may be made to a user or to a further computer sub-routine which then retrieves and loads the test program, as indicated in step 298. If ID determined test program has not already been retrieved from memory or required to be inserted by an operator, it is loaded into computer 18 in step 298, and in step 300, it is executed. In step 302 the results of test program execution are reported in the fashion specified, for example, in the configuration or test program or selected by an operator. Path 304 provides a loop-back to step 298 in the event that the test program is incremental, that is, the second test depends upon results of the first test, etc. Path 306 provides a loop-back to step 286 in the event that the results of a first test require reconfiguration of tester 10 before proceeding with a further test, and so forth. Path 308 provides a loop-back to decision step 282, for example, in the event that RFM 12 is removed before a test sequence is fully completed. On completion of the desired test sequence or other termination event, path 310 leads to "end" 304 whereupon testing stops. Those of skill in the art will understand based on the teachings herein that many other substeps may be executed by tester 10 in connection with the flow chart of FIG. 6, and that many different signals are exchanged between the various elements. Configuration and/or initialization of tester 10 and/or retrieving a test program performed in steps 288 and 298 may include, for example: (i) retrieving a sub-routine which prompts the test equipment or test equipment operator to perform a configuration or initialization or other step, such as for example, turning off the final RF power amplifier stage in a cellular base station being tested, or (ii) coupling to a local or other network to access one or more data bases containing information useful for testing, maintenance or repair, as for example, schematics, maintenance or operating manuals, troubleshooting guides, past maintenance history and other information which can be displayed to the operator or used by the tester, or (iii) down-loading programs to local processors on RFM 12 and or among elements 14 which are intended to control or execute various sub-routines or sub-functions required by the selected test program. These and other examples provided herein are intended to be illustrative for convenience of understanding and not to be limiting.

It will be apparent to those of skill in the an based on the teachings herein that the present invention provides an improved tester and method. By partitioning the tester into common test elements or functions and radio specific test elements or functions, and by collecting the radio specific test elements or functions on a removable, preferably pluggable personality module (RFM), and by coupling all of the test elements by means of a common bus, access to which is alterable under control of the personality module, a much more flexible tester can be build. Further, by employing a small light-weight general purpose computer to control the bus and the overall operation of the tester in conjunction with the personality module, very complex radio functions can be tested with little or no manual reconfiguration of the tester other than providing the appropriate personality module and the configuration, initialization and test software. This is of great practical importance in connection with modem radios which employ a great diversity of signaling schemes, operating frequencies, coding and decoding and bandwidth compression and decompression techniques.

The foregoing description has been limited to specific embodiments of this invention. It will be apparent, however, that the invention can be practiced in systems having more diverse basic construction than is disclosed in this specification with the attainment of some or all of the advantages of the invention. Therefore, it is the object of the appended claims to cover all such variations and modifications as come within the spirit and scope of the present invention.

What is claimed is:

1. A test set for testing multiple types of radios, comprising, a multiport bus, a programmable computer coupled to the bus for controlling operation of the radio test set via operation of the multiport bus, a first group of test elements coupled to the bus and common to all types of radios being tested by the test set and a second group of test elements coupled to the bus and specific to each type of radio to be tested, wherein the second group of test elements are contained within one or more replaceable personality modules which couple to the multiport bus for providing those test elements, the personality module further comprises an identification (ID) unique to each particular type of radio to be tested, and circuits beyond the first group of test elements that are needed to test a particular type of radio.

2. The test set of claim 1 wherein the second group of test elements for said particular type of radio are provided in a single personality module.

3. The test set of claim 1 wherein the personality module couples to the bus by means of a user demountable connector.

4. The test set of claim 1 wherein said ID is discernible by electrical signals provided on the bus.

5. The test set of claim 4 wherein the programmable computer interrogates the personality module to access the ID thereon.

6. The test set of claim 4 wherein the computer uses the ID to access a program stored in memory accessible to the computer, said program causing test elements required to test the particular radio type to which the ID pertains to be electrically coupled to the bus in a manner suitable for testing such radio.

7. The test set of claim 6 wherein the computer uses the ID to access a program stored in memory accessible to the computer, said program causing test elements required to test the particular radio type to which the ID pertains to be initialized in a manner suitable for testing such radio.

8. The test set of claim 6 wherein the computer uses the ID to access a program stored in memory accessible to the computer, said program causing test elements required to test the particular radio type to which the ID pertains to be coupled to the bus in a manner such that signals originating within the first group of elements pass via the bus to the second group of elements and then pass via the bus back to members of the first group of elements.

9. The test set of claim 1 wherein the personality module contains a bus programming element which causes signals originating in the first group of test elements to communicate with the second group of test elements via the bus in a manner to exercise the particular radio to be tested.

10. The test set of claim 1 wherein the personality module comprises a signal demodulation element and a signal modulation element particular to the radio type to be tested, coupled to the bus.

11. The test set of claim 10 wherein the signal demodulation and modulation elements are coupled to the bus under the control of a bus programming element within the module.

12. The test set of claim 1 wherein the personality module contains stored information used by the computer to configure the test set for a particular radio associated with the personality module to be tested.

13. The test set of claim 1 wherein the personality module comprises a port to which at least a portion of the signals required to be sent to or received from the radio to be tested are coupled.

14. A method for operating a computer controlled radio tester able to test multiple types of radios, wherein said tester has a first group of multiple controllable test elements coupled to the computer and to each other by a multiport bus and a second group of multiple test elements able to be coupled to said multiport bus by provision of a personality module containing said second group of test elements, wherein the first group of test elements provides generic test functions and the second group of test elements provides test functions specific to one or more of said multiple types of radios, said method comprising the steps of:

coupling a first module having test elements specifically for testing a first of said multiple types of radios to said bus;

causing said computer to interrogate said first module and determine therefrom an index;

retrieving a first test configuration program available to said computer using said index;

executing said first test configuration program to cause said computer to couple particular members of said first and second groups of elements into a first test configuration suitable for testing said first of said multiple types of radios; and testing said radio using said first test configuration.

15. The method of claim 14 wherein the step of executing said first configuration program comprises providing loop-through signal paths extending from members of the second group of test elements via the bus to members of the first group of test elements and via the bus to same or different members of the second group of test elements.

16. The method of claims 14 wherein the step of executing said fast configuration program comprises providing loop-through signal paths extending from members of the first group of test elements via the bus to members of the second group of test elements and via the bus to same or different members of the first group of test elements.

17. The method of claim 14 wherein the retrieving step comprises retrieving a test configuration initialization program whose execution by the computer initializes predetermined members of the first or second groups of test elements or both.

18. The method of claim 17 further comprising retrieving based on said index, a test sequence operable by said test configuration for testing said radio.

19. The method of claim 17 further comprising, reporting completion of the executing step to a routine for calling a test program for operating the tester to test the radio using the personality module.

20. A tester for multiple types of radios, said tester comprising, a bus, a first group of generic test elements common to said multiple types of radios to be tested and a second group of test elements mounted within a module which is user insertable into a plug contained within said tester, said second group of test elements being specific to one of said multiple types of radios, said first and second groups of test elements being coupled to said bus in a variable manner determined by means of a radio type identifier contained within the pluggable module.

21. The tester of claim 20 further comprising a programmable computer and wherein actions of the test elements are controlled by the programmable computer through the bus, said computer operating under control of a stored program retrieved based on the radio type identifier.

22. The test set of claim 21 wherein the computer uses the radio type identifier to access a program stored in memory accessible to the computer, said program causing test elements required to test the said one of said multiple types of radios to be electrically coupled to the bus in a manner suitable for testing such radio.

23. The test set of claim 22 wherein the computer uses the radio type identifier to access a program stored in memory accessible to the computer, said program causing test elements required to test said one of said multiple types of radios to be initialized in a manner suitable for testing such radio.

24. The test set of claim 21 wherein the computer uses the radio type identifier to access a program stored in memory accessible to the computer, said program causing test elements required to test said one of said multiple types of radios to be coupled to the bus in a manner such that signals originating within the first group of elements pass via the bus to the members of the second group of elements and then pass via the bus to same or other members of the first group of elements.

25. The test set of claim 21 wherein the computer uses the radio type identifier to access a program stored in memory accessible to the computer, said program causing test elements required to test said one of said multiple types of radios to be coupled to the bus in a manner such that signals originating within the second group of elements pass via the bus to members of the first group of elements and then pass via the bus to same or other members of the second group of elements.

26. The test set of claim 21 wherein the computer uses the radio type identifier to access a program stored in memory accessible to the computer, said program causing test elements required to test said one of said multiple types of radios to be coupled to the bus in a manner such that signals originating within the second group of elements pass via the bus to members of the first group of elements.

27. The test set of claim 21 wherein the computer uses the radio type identifier to access a program stored in memory accessible to the computer, said program causing test elements required to test said one of said multiple types of radios to be coupled to the bus in a manner such that signals originating within the first group of elements pass via the bus to members of the second group of elements.

28. The test set of claim 21 wherein the computer uses the radio type identifier to access a program stored in memory accessible to the computer, said program causing test elements required to test said one of said multiple types of radios to be coupled to the bus in a manner such that signals originating within the first or second groups of elements pass via the bus to other members of the first or second groups of elements, said other members being different for different radio type identifiers.

29. The test set of claim 21 wherein the computer uses the radio type identifier to access a program stored in memory accessible to the computer, said program causing test elements required to test said one of said multiple types of radios to be coupled to the bus in a manner such that signals originating within the first or second groups of elements pass via the bus to members of the second or first groups of elements, said members being different for different radio type identifiers.

30. The tester of claim 20 wherein the second group of test elements comprise at least a modulator and a demodulator.

31. The tester of claim 30 wherein the second group of test elements further comprises a CODEC.

32. The tester of claim 20 wherein the second group of elements comprise a bus programming element.

* * * * *